US009246882B2

(12) United States Patent
Oliver

(10) Patent No.: US 9,246,882 B2
(45) Date of Patent: Jan. 26, 2016

(54) METHOD AND APPARATUS FOR PROVIDING A STRUCTURED AND PARTIALLY REGENERABLE IDENTIFIER

(75) Inventor: Ian Justin Oliver, Söderkulla (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 18 days.

(21) Appl. No.: 13/594,036

(22) Filed: Aug. 24, 2012

(65) Prior Publication Data

US 2013/0061036 A1    Mar. 7, 2013

Related U.S. Application Data

(60) Provisional application No. 61/529,039, filed on Aug. 30, 2011.

(51) Int. Cl.
*H04L 29/06* (2006.01)
*G06F 21/73* (2013.01)
*H04L 9/32* (2006.01)

(52) U.S. Cl.
CPC ............ *H04L 63/0421* (2013.01); *G06F 21/73* (2013.01); *G06F 2221/2107* (2013.01); *G06F 2221/2129* (2013.01); *H04L 9/3239* (2013.01)

(58) Field of Classification Search
CPC ............................ H04L 63/0421; G06F 21/73
USPC ........................... 713/150–151, 189; 726/2–4
See application file for complete search history.

(56) References Cited

U.S. PATENT DOCUMENTS

| 4,852,165 | A  | * | 7/1989  | Copella ................. G07F 7/1016 380/29 |
| 5,227,613 | A  | * | 7/1993  | Takagi ................. G06K 7/0008 235/380 |
| 5,913,217 | A  | * | 6/1999  | Alger et al. .................... 713/502 |
| 5,966,705 | A  | * | 10/1999 | Koneru ............. G06F 17/30899 1/1 |
| 6,148,342 | A  | * | 11/2000 | Ho ....................... G06F 21/6245 709/223 |
| 6,567,920 | B1 | * | 5/2003  | Cromer ................. G06F 21/313 713/176 |
| 6,775,737 | B1 |   | 8/2004  | Warkhede et al. |
| 6,833,787 | B1 |   | 12/2004 | Levi |

(Continued)

FOREIGN PATENT DOCUMENTS

| EP | 1 548 580 A2    | 6/2005 |
| WO | WO 2005/066735 A1 | 7/2005 |

(Continued)

OTHER PUBLICATIONS

Jiang et al.; A secure distributed framework for achieving k-anonymity; Published in: Journal The VLDB Journal—The International Journal on Very Large Data Bases archive; vol. 15 Issue 4; Nov. 2006; pp. 316-333; ACM Digital Library.*

(Continued)

*Primary Examiner* — Bradley Holder
(74) *Attorney, Agent, or Firm* — Ditthavong & Steiner, P.C.

(57) ABSTRACT

An approach is provided for generating a structured and partially regenerable identifier. An identification generation platform receives a request to generate at least one regenerable that includes, at least in part, a plurality of fields. The identification generation platform determines to separately hash and/or encrypt the respective ones of the plurality of fields. A generation of the at least one identifier is caused, based at least in part, on the hashed and/or encrypted respective ones of the plurality of fields.

18 Claims, 10 Drawing Sheets

(56) References Cited

U.S. PATENT DOCUMENTS

| | | | |
|---|---|---|---|
| 7,000,114 B1* | 2/2006 | Hasebe | H04L 9/3247 713/170 |
| 7,366,912 B2* | 4/2008 | Sturgis | H04L 63/0435 713/171 |
| 7,503,072 B2* | 3/2009 | Hughes et al. | 726/26 |
| 7,522,731 B2* | 4/2009 | Klemba | H04L 63/0428 380/285 |
| 7,647,279 B2* | 1/2010 | Bourrieres | G06Q 20/3674 705/64 |
| 7,802,310 B2* | 9/2010 | Farber et al. | 726/28 |
| 8,196,208 B2* | 6/2012 | Kim | G06F 21/10 726/26 |
| 8,386,990 B1* | 2/2013 | Trimberger et al. | 716/136 |
| 2001/0011274 A1 | 8/2001 | Klug et al. | |
| 2003/0105807 A1 | 6/2003 | Thompson et al. | |
| 2003/0135700 A1* | 7/2003 | Schultz et al. | 711/154 |
| 2004/0177168 A1 | 9/2004 | Alabraba et al. | |
| 2004/0228490 A1* | 11/2004 | Klemba | H04L 63/0428 380/270 |
| 2005/0038906 A1 | 2/2005 | Banes et al. | |
| 2005/0075984 A1* | 4/2005 | Bourrieres | G06Q 20/3674 705/64 |
| 2005/0102672 A1* | 5/2005 | Brothers | 718/1 |
| 2005/0193191 A1* | 9/2005 | Sturgis | H04L 63/0435 713/155 |
| 2006/0020578 A1* | 1/2006 | Hood | G06F 9/4435 1/1 |
| 2006/0176602 A1 | 8/2006 | Honjo et al. | |
| 2006/0200677 A1* | 9/2006 | Marinescu | 713/182 |
| 2006/0200855 A1 | 9/2006 | Willis | |
| 2006/0259623 A1 | 11/2006 | Crawford et al. | |
| 2007/0174472 A1 | 7/2007 | Kulakowski | |
| 2008/0115078 A1 | 5/2008 | Girgaonkar | |
| 2008/0243938 A1 | 10/2008 | Kottomtharayil et al. | |
| 2008/0281855 A1* | 11/2008 | Lange et al. | 707/102 |
| 2008/0293379 A1* | 11/2008 | Hinton | H04L 63/0414 455/411 |
| 2008/0320566 A1 | 12/2008 | Herzog et al. | |
| 2009/0164800 A1 | 6/2009 | Johansson et al. | |
| 2009/0227290 A1 | 9/2009 | Chien | |
| 2009/0235326 A1 | 9/2009 | Cho et al. | |
| 2009/0271625 A1 | 10/2009 | Kolluru et al. | |
| 2010/0100940 A1* | 4/2010 | Reynolds | 726/4 |
| 2010/0131764 A1 | 5/2010 | Goh | |
| 2010/0229241 A1 | 9/2010 | Liu et al. | |
| 2010/0250946 A1 | 9/2010 | Korte et al. | |
| 2010/0269174 A1 | 10/2010 | Shelest | |
| 2011/0087807 A1 | 4/2011 | Kottomtharayil et al. | |
| 2011/0131564 A1 | 6/2011 | Vidal et al. | |
| 2011/0154472 A1 | 6/2011 | Anderson et al. | |
| 2012/0008769 A1 | 1/2012 | Collins et al. | |

FOREIGN PATENT DOCUMENTS

| | | | |
|---|---|---|---|
| WO | WO 2006/001710 A1 | 1/2006 | |
| WO | WO 2007/062672 A1 | 6/2007 | |
| WO | 2010/032211 A1 | 3/2010 | |
| WO | WO 2010/125546 A1 | 11/2010 | |
| WO | WO 2010/149838 A1 | 12/2010 | |
| WO | WO 2011/049553 A1 | 4/2011 | |

OTHER PUBLICATIONS

Cox et al.; Secure spread spectrum watermarking for multimedia; Published in: Image Processing, IEEE Transactions on (vol. 6, Issue: 12); pp. 1673-1687; Date of Publication: Dec. 1997; IEEE Xplore.*
Guan et al., "WebIBC: Identify Based Cryptography for Client Side Security in Web Applications", conference publication, Jun. 2008, pp. 689-696, The 28th International Conference on Distributed Computing Systems.
He et al., "A Mechanism for Personal Control over Mobile Location Privacy", pp. 1-7, http://www.wu.ece.ufl.edu.
Henrici et al., "Hash-based Enhancement of Location Privacy for Radio-Frequency Identification Devices using Varying Identifiers", conference publication, Mar. 2004, pp. 149-153, Proceedings of the Second IEEE Annual Conference on Pervasive Computing and Communications Workshops.
International Search Report for International Application No. PCT/FI2012/050279, dated Jun. 28, 2012.
Office Action for related U.S. Appl. No. 13/099,677, dated Oct. 29, 2012, pp. 1-21.
Written Opinion of the International Searching Authority for International Application No. PCT/FI2012/050279, dated Jun. 28, 2012.
International Search Report and Written Opinion for International Application No. PCT/FI2012/050814, dated Nov. 29, 2012, pp. 1-12.
Non Final Office Action for related U.S. Appl. No. 13/099,677, dated Oct. 29, 2012, pp. 1-21.
European Office Action for related European Application No. 12828340.5-1870 dated Mar. 19, 2015, 6 pages.
Microsoft, "A Universally Unique IDentifier (UUID) URN Namespace", retrieved on Jun. 17, 2015 from https://www.ietf.org/rfc/rfc4122.txt, 2005, 30 pages.
Supplemental European Office Action for related European Application No. 12828340.5-1870 dated Apr. 9, 2015, 7 pages.

* cited by examiner

| SEED 141 | SERVICE NAME 143 | DEVICE ID 145 | USER ID 147 | APPLICATION ID 151 |
|---|---|---|---|---|
| | | | | |

200

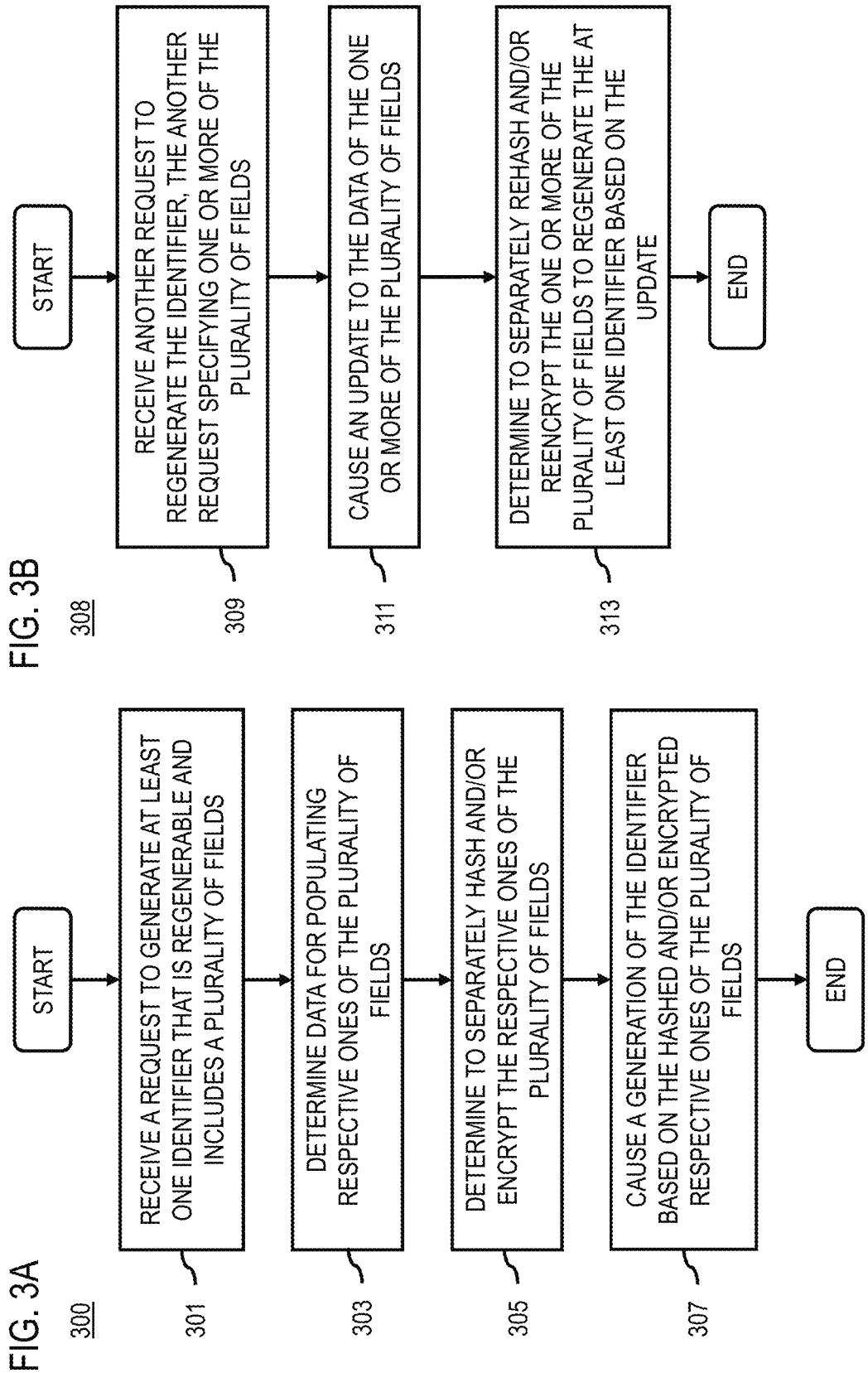

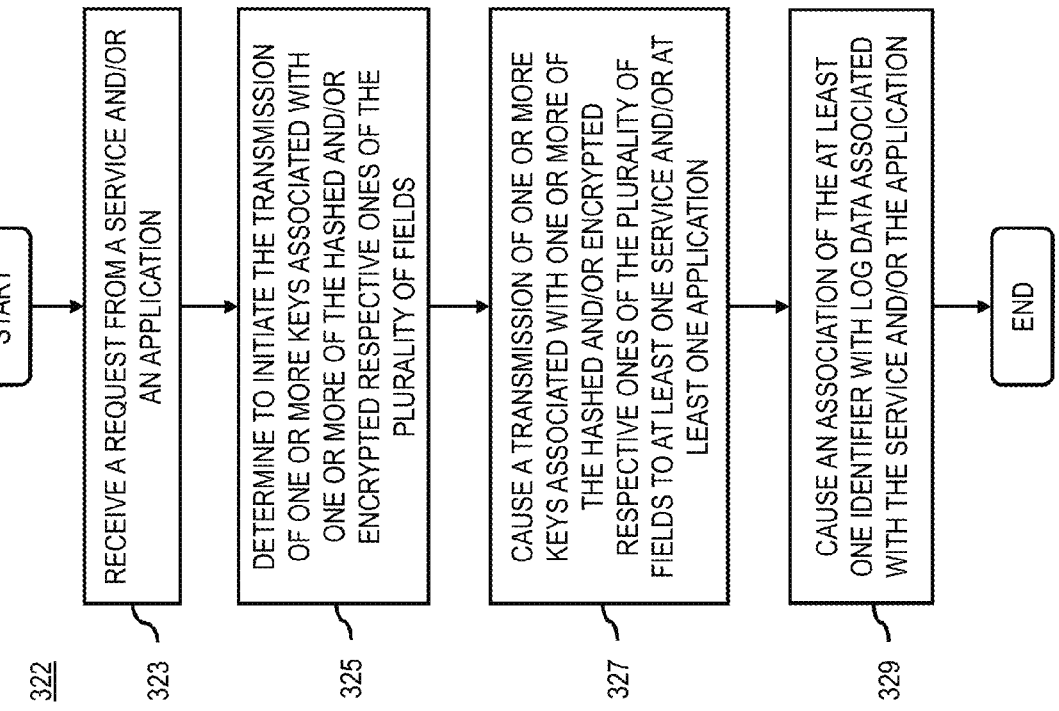
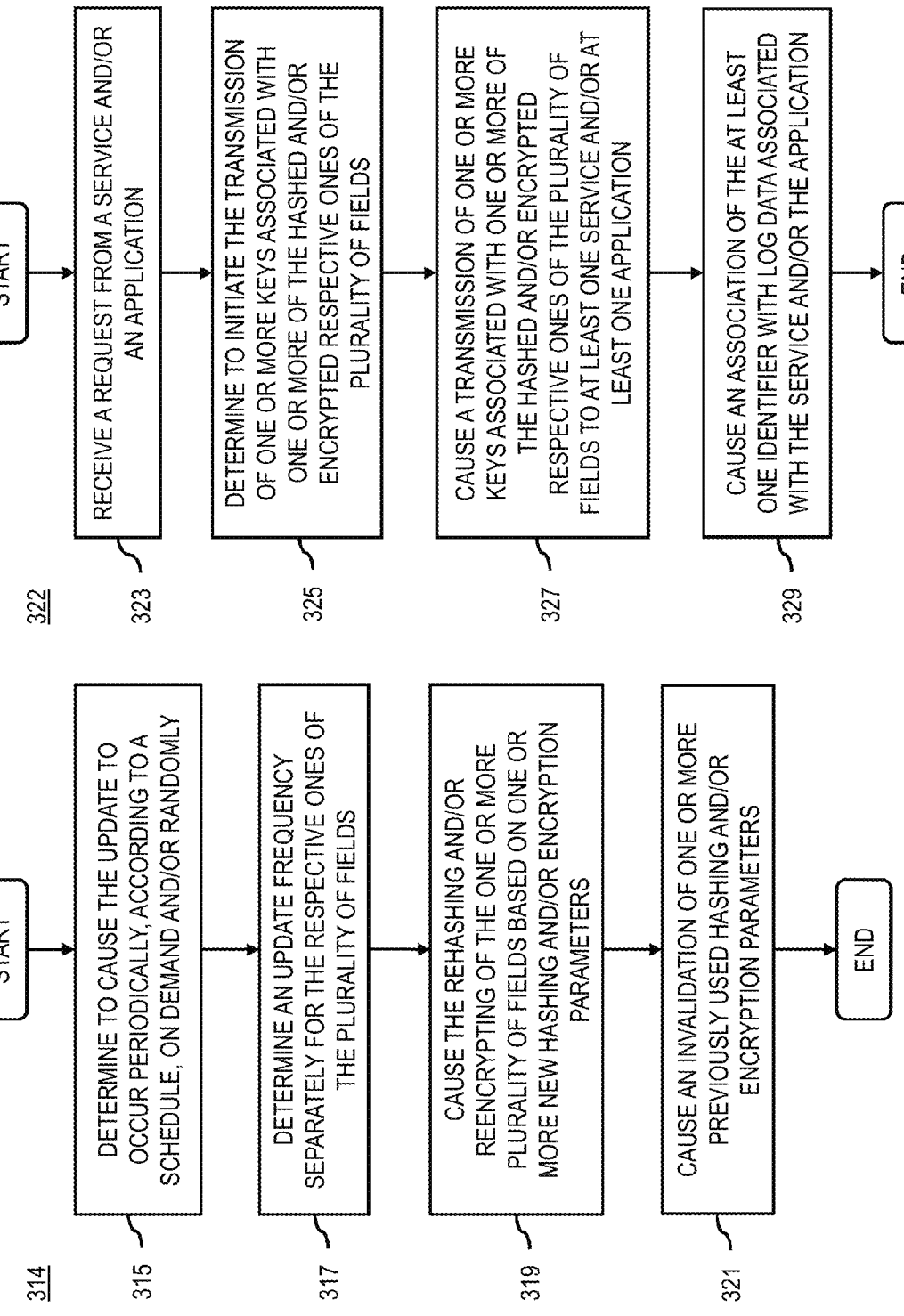

400

METHOD AND APPARATUS FOR PROVIDING A STRUCTURED AND PARTIALLY REGENERABLE IDENTIFIER

RELATED APPLICATIONS

This application claims benefit of the earlier filing date under 35 U.S.C. §119(e) of U.S. Provisional Application Ser. No. 61/529,039 filed Aug. 30, 2011, entitled "Method and Apparatus for Providing a Structured and Partially Regenerable Identifier," the entirety of which is incorporated herein by reference.

BACKGROUND

Service providers and device manufacturers (e.g., wireless, cellular, etc.) are continually challenged to deliver value and convenience to consumers by, for example, providing compelling network services. One area of development is ensuring the protection of private or sensitive information pertaining to the user or user devices that communicate over a network. By way of example, many applications and services operable by a device employ the use of identifiers for communicating with the various servers, backend databases and services they require to fulfill application processing tasks. Hence, a mapping application may engage a third party mapping service by indicating its unique identifier to facilitate the authentication and location finding processes required for receiving map information. Unfortunately, the identifier passed along is often static or unstructured in form, making it susceptible to being linked directly to the device user through analysis, inference and other means. Consequently, confidentiality and privacy is limited as users have no fine-grained control over how the various fields of the identifiers are masked or the pace at which the identifiers are updated.

SOME EXAMPLE EMBODIMENTS

Therefore, there is a need for an approach for providing a structured and partially regenerable identifier by, for instance, adapting select fields of an identifier to be associated with log data generated for an application of a user device.

According to one embodiment, a method comprises receiving a request to generate at least one identifier, wherein the at least one identifier is regenerable and includes, at least in part, a plurality of fields. The method also comprises determining data for populating respective ones of the plurality of fields. The method also comprises determining to separately hash and/or encrypt the respective ones of the plurality of fields. The method further comprises causing, at least in part, a generation of the at least one identifier based, at least in part, on the hashed and/or encrypted respective ones of the plurality of fields.

According to another embodiment, an apparatus comprises at least one processor, and at least one memory including computer program code for one or more programs, the at least one memory and the computer program code configured to, with the at least one processor, cause, at least in part, the apparatus to receive a request to generate at least one identifier, wherein the at least one identifier is regenerable and includes, at least in part, a plurality of fields. The apparatus is also caused to determine data for populating respective ones of the plurality of fields. The apparatus is further caused to determine to separately hash and/or encrypt the respective ones of the plurality of fields. The apparatus further causes, at least in part, a generation of the at least one identifier based, at least in part, on the hashed and/or encrypted respective ones of the plurality of fields.

According to another embodiment, a computer-readable storage medium carries one or more sequences of one or more instructions which, when executed by one or more processors, cause, at least in part, an apparatus to receive a request to generate at least one identifier, wherein the at least one identifier is regenerable and includes, at least in part, a plurality of fields. The apparatus is also caused to determine data for populating respective ones of the plurality of fields. The apparatus is further caused to determine to separately hash and/or encrypt the respective ones of the plurality of fields. The apparatus further causes, at least in part, a generation of the at least one identifier based, at least in part, on the hashed and/or encrypted respective ones of the plurality of fields.

According to another embodiment, an apparatus comprises means for receiving a request to generate at least one identifier, wherein the at least one identifier is regenerable and includes, at least in part, a plurality of fields. The apparatus also comprises means for determining data for populating respective ones of the plurality of fields. The apparatus also comprises means for determining to separately hash and/or encrypt the respective ones of the plurality of fields. The apparatus further comprises means for causing, at least in part, a generation of the at least one identifier based, at least in part, on the hashed and/or encrypted respective ones of the plurality of fields.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1B is a diagram of a data structure of a regenerable identifier having one or more adaptable fields, according to one embodiment;

FIGS. 3A-3D are flowcharts of processes for adapting select fields of an identifier to be associated with log data generated for an application of a user device, according to various embodiments;

DESCRIPTION OF SOME EMBODIMENTS

Examples of a method, apparatus, and computer program for providing a structured and partially regenerable identifier are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to services and applications executable by way of a user device, it is contemplated that the approach described herein may be used within the context of device interaction with network systems, support systems, backend systems, web services, cloud-based architectures, or the like.

Figure 1A:
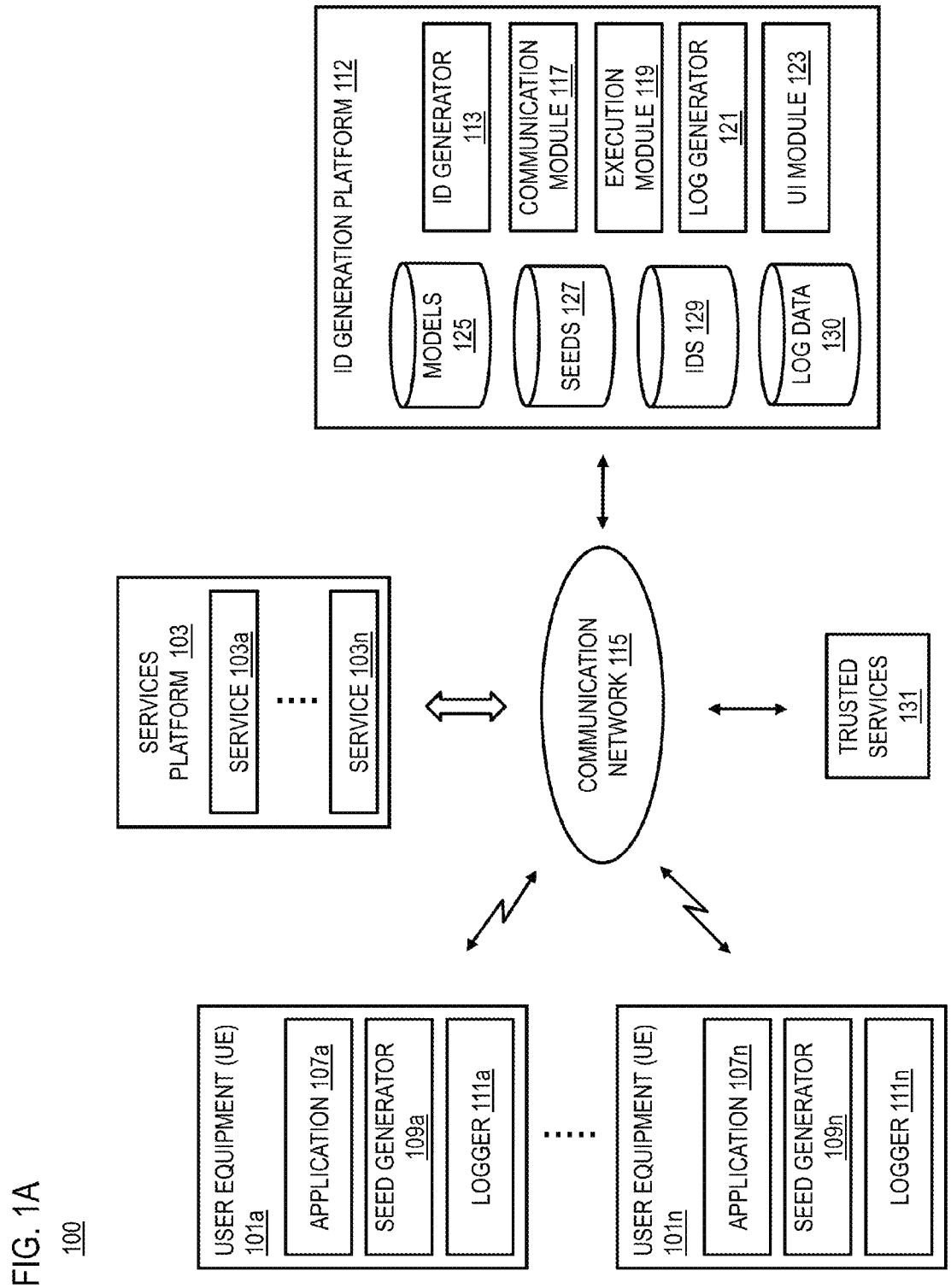
FIG. 1A is a diagram of a system capable of providing a structured and partially regenerable identifier, according to one embodiment.

FIG. 1A is a diagram of a system capable of providing a structured and partially regenerable identifier, according to one embodiment. By way of example, the system enables users to modify or customize one or more fields of a unique identifier on a periodic, on demand or random basis. The respective fields of the identifier are populated in whole or part using seed data provided by a seed generator 109a. Once populated, the fields are then processed according to various hashing, data encoding and/or data encryption techniques in order to generate or regenerate a value for the unique identifier. The unique identifier is then associated with activity log data maintained in connection with an application or service of the device.

Many applications and services operable by cellular phones, laptops and other wireless communication devices employ the use of identifiers for various reasons. In certain instances, the identifiers are used by applications or services at a device as credential or reference data for communicating with the servers or backend databases required to fulfill application processing tasks. Hence, when access to a third-party service is required by an application or service, certain application tasks may be facilitated by sending a request message to the third-party service that indicates the nature of the request, location information for the user device, message decoding and generation instructions, at least one identifier associated with the user device or requesting application, etc. By way of example, a media player application operable may engage a third-party media content service or other trusted source in order to retrieve media to be executed by the player. To fulfill the request, the calling media player application indicates a unique identifier of the device, user, service or application in order to facilitate the required authentication, data sharing, location determination and content retrieval processes.

Typically, the third-party service provider operates independent of the communication service provider that hosts, supports and enables execution of the device over an established communication network (e.g., Nokia, Verizon, Sprint). Consequently, it is common for these third-party services to perform various analytics, analysis and processing of the identifier values associated with service or application log data pertaining to the calling application or service. Through a process of deduction, information sharing and data analysis, one or more of the third-party service providers may correlate the identifier with a specific user or user device—i.e., determine the name, e-mail address, location or profile of a user based on information within the identifier. Hence, the static nature of an identifier poses a challenge to maintaining the confidentiality and privacy of the user. Furthermore, even when the identifiers are periodically changed or encrypted, the user has limited control over what elements if any of the identifier may be adapted to affect the generation or regeneration of said identifiers.

To address this problem, a system 100 of FIG. 1A introduces the capability for a user device to generate seed values to be used for populating one or more fields of a unique identifier. The unique identifier conforms to a data structure comprising fields for maintaining data representative of, for example, a service name, device identifier, user identifier, application identifier or other data item. A seed value may also comprise a field of the unique identifier for use in connection with a hashed and/or encrypted form of a respective field of the unique identifier. The seed value may include, for example, any data item that serves as a public or private key to be used in connection with a hash, encryption or data encoding scheme for generation of a unique value (e.g., unique identifier), data masking, etc. Similarly, respective fields of the unique identifier may also be populated with a key such that each field is encrypted, hashed and/or encoded separately, i.e., each field with a different private key. A user interface may be provided for enabling the user of a device to establish a key or seed value for affecting a specific field.

By way of example, an identifier (ID) generation platform 112 operates in connection with one or more user equipment (UE) 101a-101n running various applications 107a-107n or services respectively. Applications executable by UE 101a-101n may include, for example, a mapping application, location application, a social networking application, a contact management application, a document processing application, a network conferencing application, a chat application, an e-mail application, a data synchronization application, a media content provisioning application, a weather data application, etc. For the purpose of illustration, an application 107 operable via UE 101a-101n is synonymous with a service executable from said device and may be described interchangeably unless otherwise noted.

In certain embodiments, UE 101a-101n is configured with a seed generator 109a-109n that generates random, unpredictable seed or key values (e.g., a random number generator). The seed generator 109 performs seed generation on a scheduled basis as established by a user of UE 101a-101n, on demand at the discretion of the user, or in response to a request for execution or access to a service 103a-103n and/or 131. The seed generator 109 may be accessed through the device 101 by way of a user interface for presenting users with various control and configuration options. This includes various controls and options for enabling selection of specific fields of the unique identifier to adapt. By way of example, the user may provide a different public/private key for a second and third field of the identifier corresponding to service name and device identifier value, while the remaining fields are left unchanged. The seed generator 109 provides another public/private key to be applied to the second and third fields for enabling encryption of said fields.

It is noted that in certain instances, the user may directly select the public/private key to be applied to a specific field by way of the user interface. In other instances, the user may call for auto-population of a field, such as by way of an identifier generation platform 112, the seed generator 109a, or a combination thereof. By way of example, a field of the unique identifier corresponding to a service name may be populated with a default value corresponding to the service in question. As another example, the user interface may present an option for the user to enable the ID generation platform 112 to randomly apply a seed value for supporting encryption and/or hashing of a field of the unique identifier.

Also of note, when the user selects to adapt a field of the unique identifier on demand or in response to a request by the ID generation platform 112 in accordance with a defined updating schedule, various executions performed include: (1) invalidating the prior hashed and/or encrypted parameter (value) associated with the field selected for adaptation; and (2) a rehashing and/or reencrypting of the field selected for adaptation is caused to occur based, at least in part, on the application of one or more newly applied seed values. As discussed more fully later on, these executions are performed in connection with an ID generation platform 112.

Still further, the seed generator 109 interacts with the ID generation platform 112 to determine a first time use, an initialization, or a combination thereof of the device 101a-101n and/or applications 107a-107n. When first time use is determined, for example, the seed generation is configured to generate at least one seed value based on the first time use, the initialization, or a combination thereof. This approach ensures proper seeding of application requests regardless of the prior state of the UE 101a-101n and/or calling application 107a-107n. In addition, this approach ensures initial values used to populate a given field or used as a respective seed value is accounted for to prevent duplication.

In addition, a logger 111a-111n operates in connection with the various applications 107a-107n for maintaining log data regarding application 107a-107n usage and device 101a-101n usage in connection with one or more services 103a-103n and 131. Log data includes, for example, any information for describing one or more processing events, a sequence or time of occurrence of said events, a device response associated with the event, a state of the application or device, or other like data. It is noted the application 107a-107n, seed generator 109a-109n and logger 111a-111n of respective UE 101a-101n are each configured to communicate singularly, or in combination, with the identifier generation platform 112 by way of communication network 115. In certain embodiments, a unique identifier is associated with various of the log data 130, i.e., the identifier being stored to the log with respect to a given event.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, identifier generation platform 112 and services 103a-103n and/or 131 communicate with each other and other components of the communication network 115 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The identifier generation platform 112 of system 100 is a processing system or service operable by or in connection with UEs 101a-101n for managing the generation, regeneration and use of identifier values with respect to one or more applications 107a-107n, services 103a-103n of a services platform 103, a trusted service 131, or a combination thereof. Seed values, once generated by the seed generator 109a-109n of respective UEs 101a-101n, are transmitted to and stored by the identifier generation platform 112 to a seed database 127. In certain embodiments, seed values may be piggybacked or chained to maximize data transmission and efficiency. These seed values may be used as keys to facilitate access to the one or more of the hashed and/or encrypted respective ones of the plurality of fields by the service and/or application.

In certain embodiments, the identifier generation platform 112 is configured to process the seeds 127 (e.g., at least one seed value) based, at least in part, on one or more value generation models 125 useful for generating a unique identifier. The models may include for example, data for supporting execution of an encryption-based hash function (e.g., 256-bit Hash-based Message Authentication Code/Secure Hash Algorithm, referred to as HMAC-SHA-256), a data normalization algorithm, data transposition logic, a key and/or table processing algorithm, or a combination thereof. The models may also include various schema, parameters or instructions for supporting the encoding or decoding of various parameters (e.g., seeds, keys) associated with a respective one of the fields of the unique identifier.

By way of the identifier generation platform 112, unique identifier values may be used in connection with a calling application 107a-107n or service of the device, i.e., to enable fulfillment of processing tasks or service requests involving third-party services. Third-party services may be accessed over a communication network 115 by respective UEs 101a-101n via a services platform 103 for implementing and/or maintaining one or more services 103a-103n. Third-party services maintained by the service platform 103 (e.g., as hosted by one or more respective third-party service providers) may include, for example, a mapping service, location service, a social networking service, a contact management service, a document processing service, a network conferencing service, a chat service, an e-mail service, a data synchronization service, a media content provisioning service, a weather data service, etc.

In addition, the service may be that for supporting a single-sign on service or group, including services for enabling multiple individual services to be connected via one sign-on service (SSO) or process (e.g., Microsoft Live, Google Apps, cloud-based single SOS, etc.). It is noted that the service platform 103 may be implemented as one or more servers, backend systems, data system infrastructures, web services, etc. Furthermore, a single services platform may provide multiple services 103a-103n or alternatively, multiple service platforms 103 may be accessed for enabling specific processing needs of calling applications 107a-107n.

The identifier generation platform 112 is also configured to present a communication interface, as supported by a communication module 117, through which the one or more services 103a-103n of the platform 103 may be engaged. The communication interface is a medium in which the applications 107a-107n may pass along requests for the services 103a-103n; the request messages generated to include at least one unique identifier generated based on at least one seed value. In certain embodiments, multiple seeds may be generated by a given UE 101 for adapting select fields of one or more unique identifiers for associating with multiple individual calls for access to a third-party service 103. In other embodiments, a single seed value may be used for adapting or updating fields of different unique identifiers; which in combination with respective unique values of a given field support generation of a unique identifier. It is noted, therefore, that the identifier generation platform 112 manages the generation and provisioning of seeds/keys to be associated with respective fields of a unique identifier to support identifier generation based on the requirements of the calling service. Generated identifiers may be generated and subsequently stored to a database 129 by the platform 112 in connection with log data 130 relating to the calling service or application.

As noted, the ability of the identifier generation platform 112 to (1) enable passage of third-party service calls and communications through an intermediary interface; and (2) process seeds 127 for application to fields of a unique identifier based on models 125 defining a specific algorithm or hash function; enables the identifier generation platform 112 to mask the semantics of identifier values as exchanging among third-party services 103a-103n. It is noted that without specific access to the particular model 125, field updated, field order, and/or seed value (e.g., public or private key) utilized to populate respective fields; third-party services 103a-103n are limited in their ability to regenerate identifier values. Consistent, periodic updating of seed and/or key values for associating with one or more fields of the unique identifier further limits temporal analysis efforts.

Consequently, respective third-party services 103a-103n or providers thereof are prevented from correlating specific identifier values with a particular user and/or UE 101a-101n. In contrast, however, seed values may be permitted for sharing among one or more trusted services 131a, such as in accordance with one or more permission and authentication settings established by the user of UE 101a-101n. This enables the calculating/generating and subsequent sharing of unique identifiers via the communication interface among trusted services 131.

The identifier generation platform 112 comprises various components for facilitating the generating and/or regenerating of unique identifier values based on the adapting of one or more fields of the unique identifiers. Generating of identifier values includes, for example, the initial processing of seeds 127 to be used with respect to the one or more fields of the identifier. Regenerating of identifiers includes, for example, application of a different seed value for accessing of respective one or more fields of a unique identifier, rehashing and/or reencrypting of respective one or more fields of a unique identifier, or a combination thereof. Per the above described settings and features of the identifier generation platform 112, the generation and regeneration process may be performed only between trusted services 131 that interact with UEs 101a-101n. No means of generation or regeneration of identifiers is possible between third-party services 103a-103n.

It is contemplated that the functions of the platform 112 is performed by way of one or more executable components. The components may be combined into one or more components or performed by other components of equivalent functionality. In this embodiment, the identifier generation platform 112 includes an ID generator 113 for generating identifier values based on the application of seeds to respective ones of the fields of the unique identifier. By way of example, the ID generator 113 is also configured to receive seed data, i.e., via a communication interface provided by the communication module 117, from seed generators 109a-109n at respective UE 101-101n.

Once received, the ID generator 113 processes the seeds 127 (e.g., at least one seed value) using one or more encryption techniques, hash functions, data normalization algorithms, data transposition logic, key and/or table processing algorithms, or a combination thereof for generating unique identifiers 129. The ID generator 113 employs models 125 that define the encryption-based algorithm, hash function (e.g., 256-bit Hash-based Message Authentication Code/Secure Hash Algorithm, referred to as HMAC-SHA-256), data normalization algorithm, data transposition logic, a key and/or table processing, etc.

By way of example, the ID generator module 113 may be configured to generate identifier values conforming to a data structure 140 as shown in FIG. 1B. The various fields of the identifier may include, for example, a service name 143 for maintaining data representative of a name of the service 103a-103n and 131 being accessed by the application 107a-107n at a device 101a-101n. Under this scenario, a service name of "MAP GENERATOR" may be associated with a map generation service as provided by a services platform 103. Other fields of the data structure 140 of the identifier may include a device identifier 145 and user identifier 147 for maintaining respective device and user identifiers associated with the service 103a-103n and 131, application 107a-107n, UE 101a-101n, or a combination thereof. Another field 151 may store an application identifier 151 relating to the application 107a-107n.

Still further, the identifier 140 may also include one or more fields 141 for storing a seed value for use in connection with a hashed and/or encrypted form of a respective field of the unique identifier. While shown as a single field 141, the seed value may be associated with each of the respective fields 143-151 of the identifier. Unlike a typical regenerable identifier, the entire identifier 140 as a compilation of fields 143-151 is not hashed and/or encrypted as a whole. Rather, each field is hashed and/or encrypted separately. The user provides a different public/private key for each field such as by way of an interface rendered by a user interface (UI) module 123 of the platform 112. In addition, each field is encrypted using a different private key, such as provided by way of the seed data 127 as generated by the seed generators 109a-109n. By way of example, a three field unique identifier may conform to the following encryption-based hash function/schema:

Identifier Value={HMAC-SHA-256(seed, Service Name), HMAC-SHA-256(seed, Device ID), HMAC-SHA-256(seed, Application ID)}

In this example, the HMAC-SHA-256 algorithm for processing of a first field of the three field identifier is a function of at least one seed value maintained as seed data 127 (e.g., a random number). It is also a function of, or passed a Service Name parameter 143, such as that corresponding to a Java Naming and Directory Interface (JNDI). JDNI is, for example, a directory service for enabling the discovery and look up of data and objects via a name. In particular, the service name corresponds to that of the particular service 103a-103n accessed for fulfillment of an application 107a-107n processing task at UE 101a-101n. It is noted that the ID generator module 113 may access a JDNI application programming interface (API) to (1) facilitate the binding of an object (e.g., a service 103) to a service name; (2) enable generation of the intermediary interface, such as to support directory lookup; and (3) enable the execution of queries or directory lookup via the intermediary interface.

Still further, the example function above includes an HMAC-SHA-256 algorithm for processing respective ones of a second and third field individually. By way of example, the HMAC-SHA-256 algorithm for the second field=is a function of a seed value and a parameter for the Device ID 145, while the algorithm for the third field is a function of a seed value and parameter for the Application ID 151. Based on the above described inputs, and the separately hashed and/or encrypted fields, the unique identifier as generated is expressed a combination of a numeric or alphanumeric identifier values. Depending on communication service provider preferences, additional parameters (e.g., checksum, status code) may also be included for generating the unique identifiers.

It is noted that the above described data structure 140 and exemplary schema is applied by the ID generator 113 for supporting rehashing and/or reencrypting of respective fields of an identifier. Also, in the case of the exemplary three field identifier described above, it is noted that the hash algorithm was not a function of a seed and corresponding parameter of the User ID field 147. This demonstrates, for example purposes, that select fields comprising the data structure 140 may be left unchanged and consequently not made subject to the hashing and/or encrypting process. Also, the sequence of execution of the hash and/or encryption algorithm may or may not correspond to the actual sequence of the structure of the data structure 140. Nonetheless, execution of partial, structured generation and regeneration of a unique identifier is still supported.

In certain embodiments, the execution module 119 controls the frequency of operation of the ID generator 113 for generating identifiers. The execution module 119 enables the acquiring and associating of timing information with seeds and/or key data to be applied in connection with the one or more fields of a unique identifier. By way of example, the timing information may correspond to a pace at which one or more fields of a unique identifier are to be updated for affecting generation or regeneration of the identifier. Seeds may be generated and determined for association with a particular field of the unique identifier on a scheduled, on demand or random basis. Furthermore, seeds 127 may be correlated with a specified temporal limit that is enforced by the execution module 119, including for example, a device lifetime, a length of time of a session between and application 107 at a device 101 and a service 103/131, a recurring event setting, etc.

Operating in connection with the ID generator 113 is a log generator 121, which acts as a collection point for application log data including one or more unique identifiers as generated herein. The log generator 121 may serve as a manager of application log data 130 as compiled by a logger 111a-111n operating at multiple UE 101a-101n for storing log data 130 accordingly. In certain embodiments, the log generator 121 may be implemented as a dynamic link library or service, Symbian service, Linux/Unix daemon, Unix/var/logger, a network access controller, Scribe Log Manager, or any other suitable data spooling or logging mechanism. It is noted that the log generator 121 may interface with the loggers 11a-111n of respective UEs 101a-101n for maintaining a master repository of data expected to continually change during normal operation of the system. Timing information may also be associated with the log data 130 for recordation and execution purposes.

Of note, the ID generator 113 may facilitate execution of the intermediary interface for enabling the calling of services and transmission of seeds 127 in conjunction with the communication module 117. By way of example, the communication module 117 supports execution of the intermediary interface over the communication network 115. In one embodiment, the communication module 117 enables formation of a session over the network 115 between the identifier generation platform 112 and the application 107, seed generator 109 and logger 111 of respective UE 101. This includes execution of various protocols and data sharing techniques for enabling collaborative execution between a user device 101a-101n (e.g., mobile devices, laptops, smartphones, tablet computers, desktop computers) and the identifier generation platform 112 over the network 115.

While shown as a separate entity, it is contemplated in certain embodiments that the identifier generation platform 112 may be integrated with the seed generator 109 or logger module 111; the operation of which is suitable for supporting the hashing, rehashing, encrypting and reencrypting of select fields of unique identifiers in response to the accessing of one or more services. Hence, the identifier generation platform 112 may be directly executable by UE 101.

In certain embodiments, integration and/or communication between the identifier generation platform 112, services platform 103, trusted services 131 and one or more UE 101a-101n is facilitated by way of communication network 115. The communication network 115 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof.

In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

Figure 2:
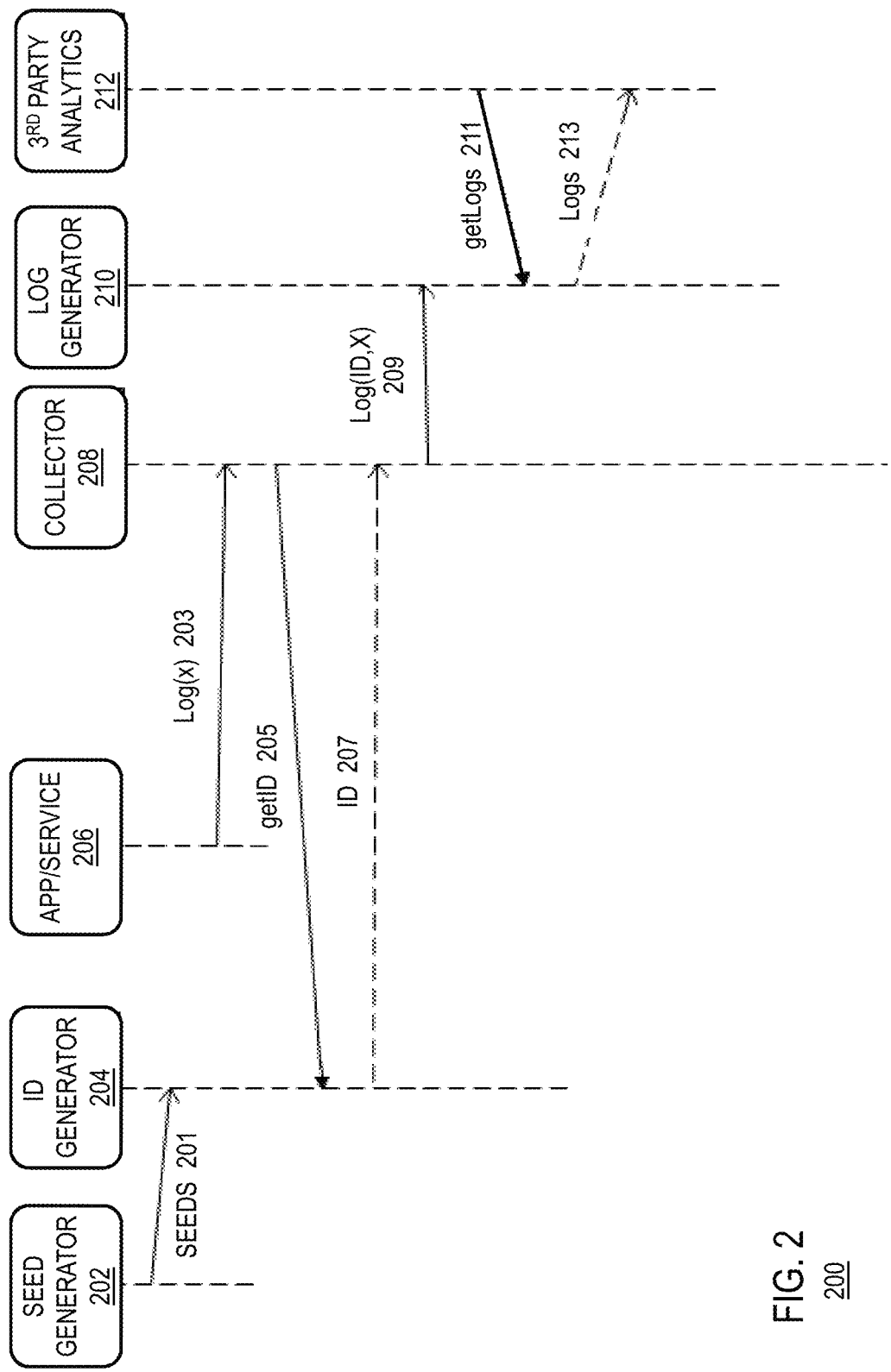
FIG. 2 is a ladder diagram depicting a process for adapting select fields of the structured identifier of FIG. 1B, according to one embodiment.

FIG. 2 is a ladder diagram depicting a process for adapting select fields of the structured identifier of FIG. 1B, according to one embodiment. For the purposes of example, the process is described with respect to the various exemplary components of the UE 101 and ID generation platform 112 as they interact with respect to a calling service. In step 201 of the process 200, the seed generator 202 of a respective user device (e.g., UE 101) generates seed values and transmits the values to the identifier generator 204 of the platform 112. The values are subsequently stored as seeds 127, which may be accessed for later use in connection with a calling application/service 206. As noted previously, the ID generator 204 may operate in connection with a user interface module that allows the user to provide requisite seed values randomly or request automated generation of such parameters on demand or periodically.

In another step 203, an application and/or service 206 requests that event data is logged as a function of one or more parameters x (i.e., log(x)). Resultantly, the application/service 206 submits this request to the collector 208, which in turn, contacts the ID generator for a suitable unique identifier to be associated with the log data (log(x)). This execution corresponds to step 205. In response to the request, the ID generator 204 returns a suitable ID to the collector 208. As noted previously, the request as submitted may include timing information conforming to various levels of temporal granularity. This may include, for example, session based, device life-time, individual logging, or other periods of time of relevance or validity of an identifier to be used. In certain embodiments, the temporal validity or use of the identifier may correspond to a temporal validity or use of a seed value associated with a respective field of the unique identifier. By way of example, a seed value associated with one field may correspond to different timing information that that of another field of the identifier.

In addition, the request can be accompanied by parameters, or user provided seeds and/or keys, for enabling the encoding of additional information in the unique identifier. By way of example, these parameters may be submitted with the request in connection with timing information via a user interface to permit the tailoring of the unique identifier relative to the application. An exemplary parameter provided by the user may include an element of common recognition to the user such as a birth date, known password, or other custom data item for association with a particular field of the user's choice.

In step 209, the log record is sent to the log generator 210. It is noted that the log data generated or acquired with respect to the application contains a reference to the identifier value such that the log is a function of at least the unique identifier (i.e., log (ID, x)) pursuant to the encryption and/or hashing mechanism. Resultantly, per steps 211 and 213, the log data can be requested and returned at the request of a third-party analytics processor 212. The analytics processor is any user or service that processes application or service log data for the purposes of information processing, data extraction, user profile or device inference, application or service use tracking, etc. Because of the unique identifier as generated, however, the log record (i.e., Log (ID, x)) features the unique identifiers as a "privatized" reference to the log or specific portions thereof. Subsequent accessing of the log data by the analytics processor 212 would also feature regenerated versions of the identifiers based on adaptation of the seed values associated with respective data fields of the identifier, timing information for enabling or prompting updates to the seeds, or a combination thereof.

It is noted that encryption and/or hashing of respective fields of the unique identifier relative to provided seeds and/or keys limits the ability of the analytics processor 212 to match the identifier back to a particular user. Over a period of time, however, user of the same identifiers increases the likelihood of being able to identify a specific user and analyze the user's behavior. Hence, to prevent this, the user is prompted to change keys or seeds for parts of the identifier by the identifier generation platform 112. In addition, the keys can be automatically regenerated on a timely basis. By way of example, the keys could be regenerated simultaneously at random intervals corresponding to the timing information. This interval can be set by the user or preconfigured as necessary. This randomness further limits the effectiveness of the analytics processor 212.

Figure 6:
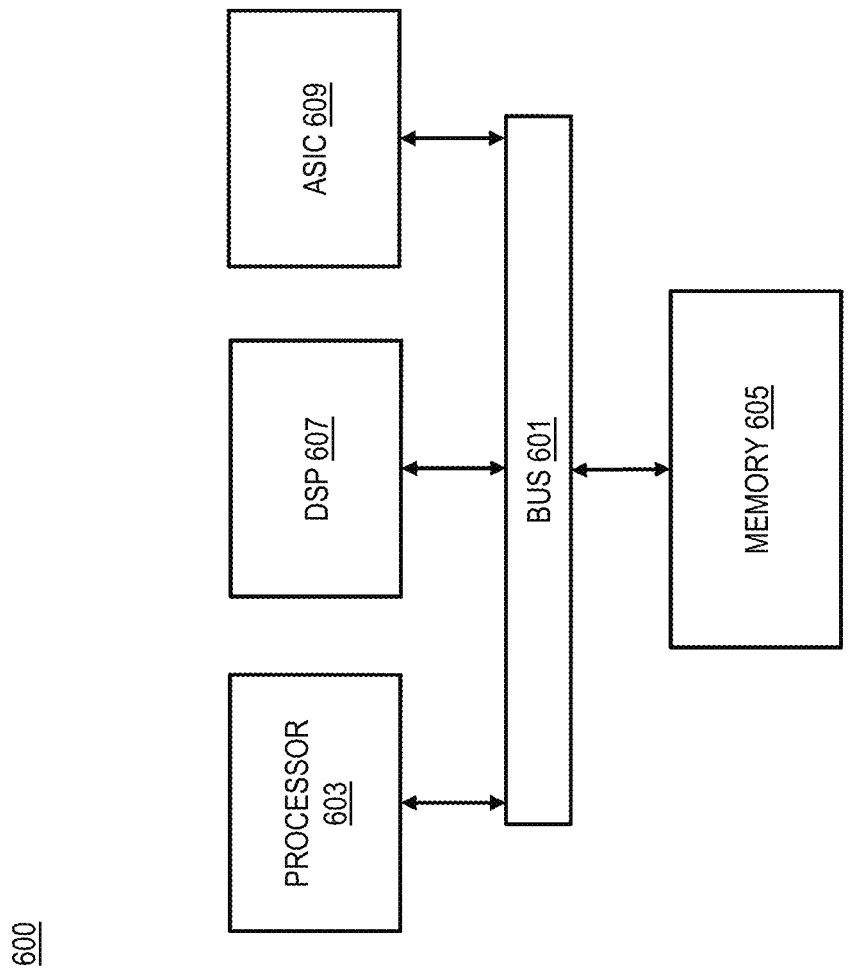
FIG. 6 is a diagram of a chip set that can be used to implement an embodiment of the invention.

FIGS. 3A-3D are flowcharts of processes for adapting and regenerating identifiers for use in connection with applications and services available to a device, according to various embodiments. In one embodiment, the identifier generation platform 112 that performs processes 300, 308, 314 and 322 is implemented in, for instance, a chip set including a processor and a memory as shown in FIG. 6. For the purpose of illustration, the processes are described with respect to FIG. 1A. It is noted that the steps of the processes may be performed in any suitable order, as well as combined or separated in any suitable manner.

In step 301 of process 300, the identifier generation platform 112 receives a request to generate at least one identifier that is regenerable and includes a plurality of fields. As noted, the various fields of the identifier may include a user identifier, service name, application identifier and device identifier. Additional fields may also be associated with a data structure representative of the unique identifier, including one or more fields for maintaining event sequence information, time stamp information, service or device status information, or the like. The fields of the identifier are structured to maintain values in accordance with the needs and requirements of the calling application for enabling the persistent logging of event data.

In step 303, the ID generation platform 112 determines data for populating respective ones of the plurality of fields. This may include the generation of the at least one seed value corresponding to a random number. Alternatively, the seed value may be implemented as an alphanumeric value or include a symbol or other data point. Per step 305, the platform 112 also determines to separately hash and/or encrypt the respective ones of the plurality of fields. As noted previously, the data for populating respective fields may include data specified by a user of the application and/or service at a user device. Each field is hashed individually respective to this determined data for populating the field rather than execution of a single hash and/or encryption of the collection of fields of the identifier. This corresponds to step 307 of the process, which includes causing a generation of the identifier based on the hashed and/or encrypted respective ones of the plurality of fields.

In step 309 of process 308 (FIG. 3B), the platform 112 receives another request to regenerate the identifier. Per step 311, the platform 112 causes an update to the data of the one or more of the plurality of fields. As mentioned, fields may be specified by way of a user interface provided by the ID generation platform 112 for receiving user specified input and parameters. In another step 313, the ID generation platform 112 determines to separately rehash and/or reencrypt the one or more of the plurality of fields to regenerate the at least one identifier based on the update. It is noted that the regeneration is performed as a function of the rehashing and/or reencrypting of the updated data respective to at least one of the plurality of fields.

In step 315 of process 314 (FIG. 3C), the platform 112 determines to cause the update to occur periodically, according to a schedule, on demand and/or randomly. This timing information may be established by the user of the device through which the service is accessed, by the provider of the ID generation platform, according to a default permission setting, etc. Per step 317, the platform 112 may further determine an update frequency separately for the respective ones of the plurality of fields. By way of this approach, the effective usefulness and uniqueness of the identifier is maximized over time while reducing any incriminating analytics processing by third-parties.

In step 319, the ID generation platform 112 causes the rehashing and/or reencrypting of the one or more plurality of fields based on one or more new hashing and/or encryption parameters. As before, the parameters may be provided in the form of seeds and/or keys by a seed generator, by the user based on user input, or a combination thereof. Per step 321, as result of the rehashing and/or reencrypting, an invalidation of one or more previously used hashing and/or encryption parameters is caused.

In step 323 of process 322 (FIG. 3D), the ID generation platform receives a request from a service and/or an application for access to log data. The platform 112 then determines to initiate the transmission of one or more keys associated with one or more of the hashed and/or encrypted respective ones of the plurality of fields. This corresponds to step 325 and may include the accessing of keys by way of a seed generator. Per step 327, the ID generation platform 112 then causes a transmission of one or more keys associated with one or more of the hashed and/or encrypted respective ones of the plurality of fields to at least one service and/or at least one application. In another step 329, at least one identifier is associated with the log data associated with the service and/or application accordingly. It is noted that authorized entities capable of accessing the log data may include trusted services 131 as provided by trusted and/or known service providers, or a designated service 103a-103n of the user device.

Figure 4A:
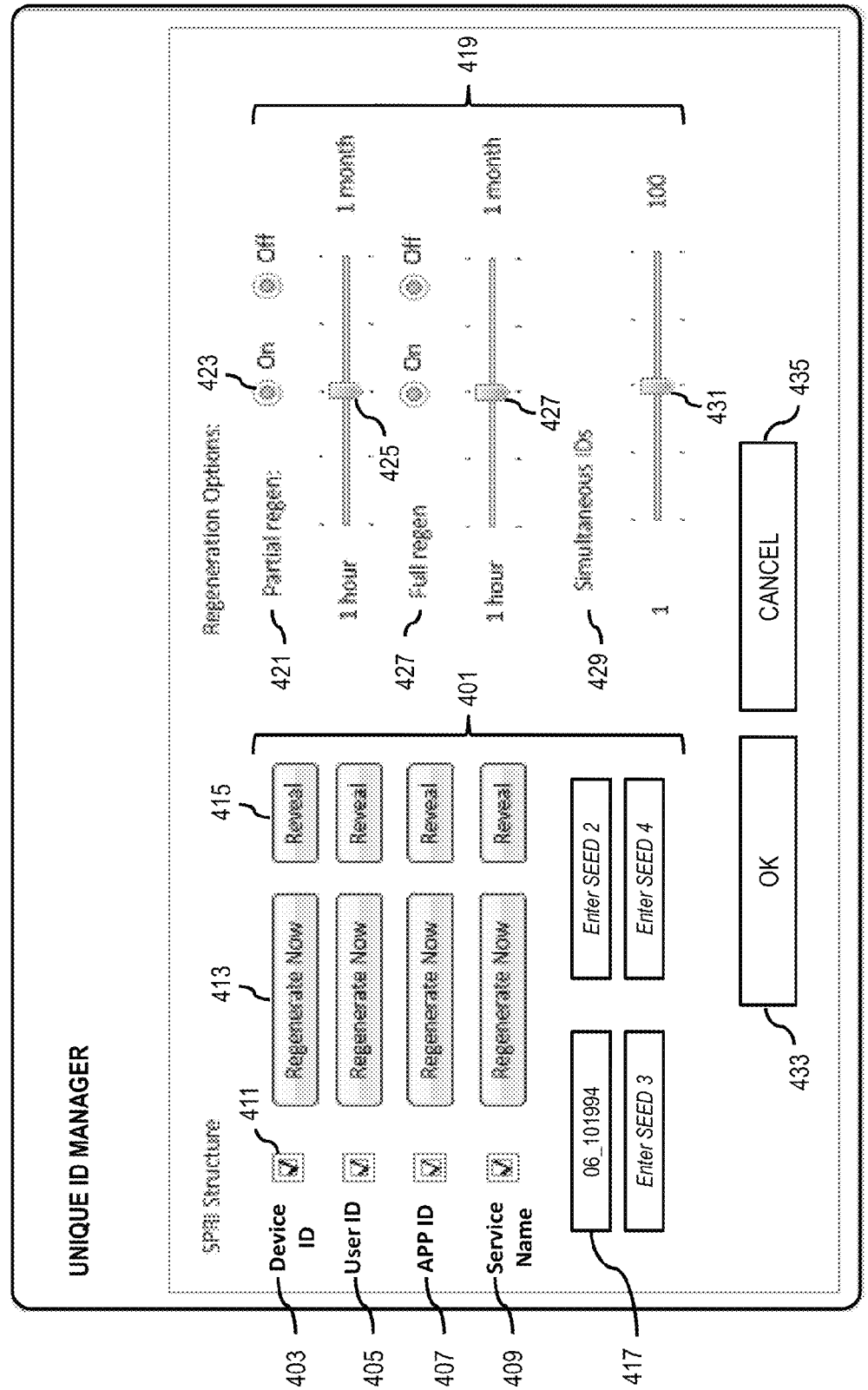
FIG. 4A is a diagram depicting a user interface of a device for adapting select fields of an identifier to be associated with log data generated for an application of a user device, according to one embodiment.

FIG. 4A is a diagram depicting a user interface of a device for adapting select fields of an identifier to be associated with log data generated for an application of a user device, according to one embodiment. The interface 400 may be presented to the display of a device, i.e., a tablet computer, mobile device, laptop, etc., and features various actions buttons, menus and other tools for enabling user interaction with the identification generation platform 112. In certain instances, presentment of the user interface occurs due to launching of the application by a user. In other embodiments, it is contemplated that the interface 400 is caused to be presented automatically such as in response to user acknowledgement of a notification message for requesting an updating of various fields of a unique identifier.

By way of example, the user interface 400 includes capabilities for managing the structure of the unique identifier according to a structure control section 401, which includes controls for affecting the various fields of the identifier. Controls include those relating to the device identifier field 403, the user identifier field 405, application identifier field 407 and service name field 409 of the data structure of FIG. 1B. A checkbox may be presented for each of the respective field 403-409 for activating or deactivating a field. The more fields selected for activation, the less privacy. In addition, a "Regenerate Now" action button, i.e., 413 may be presented for each of the fields to enable the user to select to manually regenerate a particular field.

Upon selection of the "Regenerate Now" action button 413, the cursor is caused to move to a field for enabling user entry of the identifier value they wish to associate with the field. For example, when the user selects button 413, the cursor moves to a seed input field 417 for receiving the manual input. A "Reveal" action button, i.e., 415 is also presented for enabling the user to reveal the key associated with that particular field of the unique identifier.

Another section of the interface includes a regeneration control section 419. This section enables the user to control the regeneration frequency of identifiers based on an established frequency of updating of one or more fields of the unique identifier. This enables the ID generation platform 112 to set the frequency in which individual fields will be updated automatically (privacy enhancing) and whether this feature is turned on or off. By way of example, a partial regeneration option 421 may be set to ON by way of a radio button 423. A corresponding slide bar 425 may enable the frequency to range from an update of every hour to every month. Similarly, a full regeneration option 427 may be selected to occur according to a specific frequency such that each of the fields of the unique identifier is updated accordingly.

In yet another option 429, simultaneous identifiers may be selected for association with a specific log data for a service and/or application. This option enables the user to hold multiple keys simultaneously and further allow the ID generation platform 112 to randomly select those unique identifiers. By way of example, the multiple identifiers may be maintained by the ID generation platform 112 in an identifier database 129. In certain embodiments, the user interface 400 may feature various controls for enabling more sophisticated management of the unique identifiers as some of the identifiers might have already been partially or fully revealed. While not shown, this may include one or more indicators for providing a user notification of when a corresponding identifier has already been partially or fully revealed. In addition, a slide bar 431 may also be presented for enabling the user to adjust the number of identifiers to be generated/stored.

Once the user has adapted the settings accordingly, they may select an "OK" action button 433 for saving the structure options 401 and frequency options 419. Alternatively, the user may select a "CANCEL" action button to discard the selected settings.

Figure 4B:
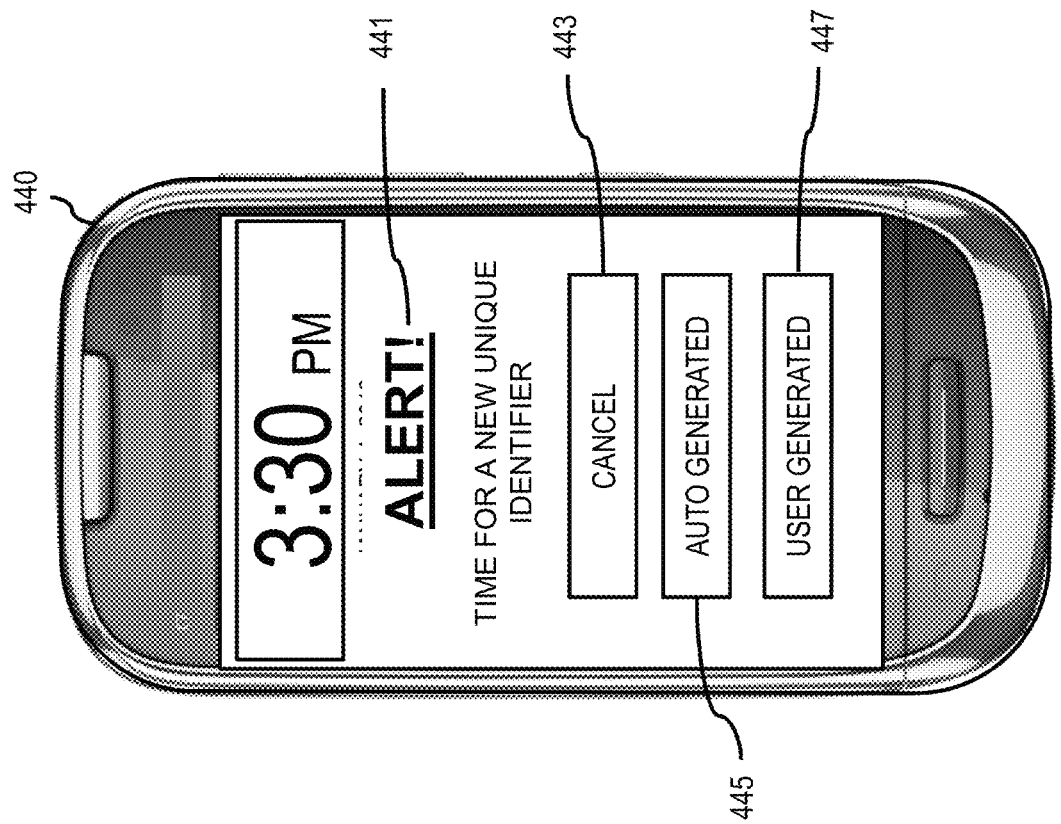
FIG. 4B is a diagram depicting a user interface of a device receiving a notification message requesting the adapting of select fields of a structured identifier, according to one embodiment.

FIG. 4B is a diagram depicting a user interface of a device receiving a notification message requesting the adapting of select fields of a structured identifier, according to one embodiment. By way of example, the user receives a notification message 441 at a user device 440 for indicating that the unique identifier is to be regenerated. This message is sent in response to one or more of the frequency control settings 419 established by way of the user interface 400 of FIG. 4A. Various action buttons 443-447 are presented for enabling the user to respond to the request, including a "CANCEL" action button 443 for ignoring the request, an "AUTO GENERATED" action button 445 for enabling the identifier generation platform 112 to select one or more keys for association with respective fields of the identifier on its own, and a "USER GENERATED" action button 447 for rendering control interface 400 of FIG. 4A to the display of the device 440. When the latter action button 447 is selected, the ID generation platform 112 is caused to anticipate the user to manually adapt several of the settings while the auto generation option enables the ID generation platform 112 to select random keys/seeds and/or activate default frequency settings.

The processes described herein for adapting select fields of an identifier to be associated with log data generated for an application of a user device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
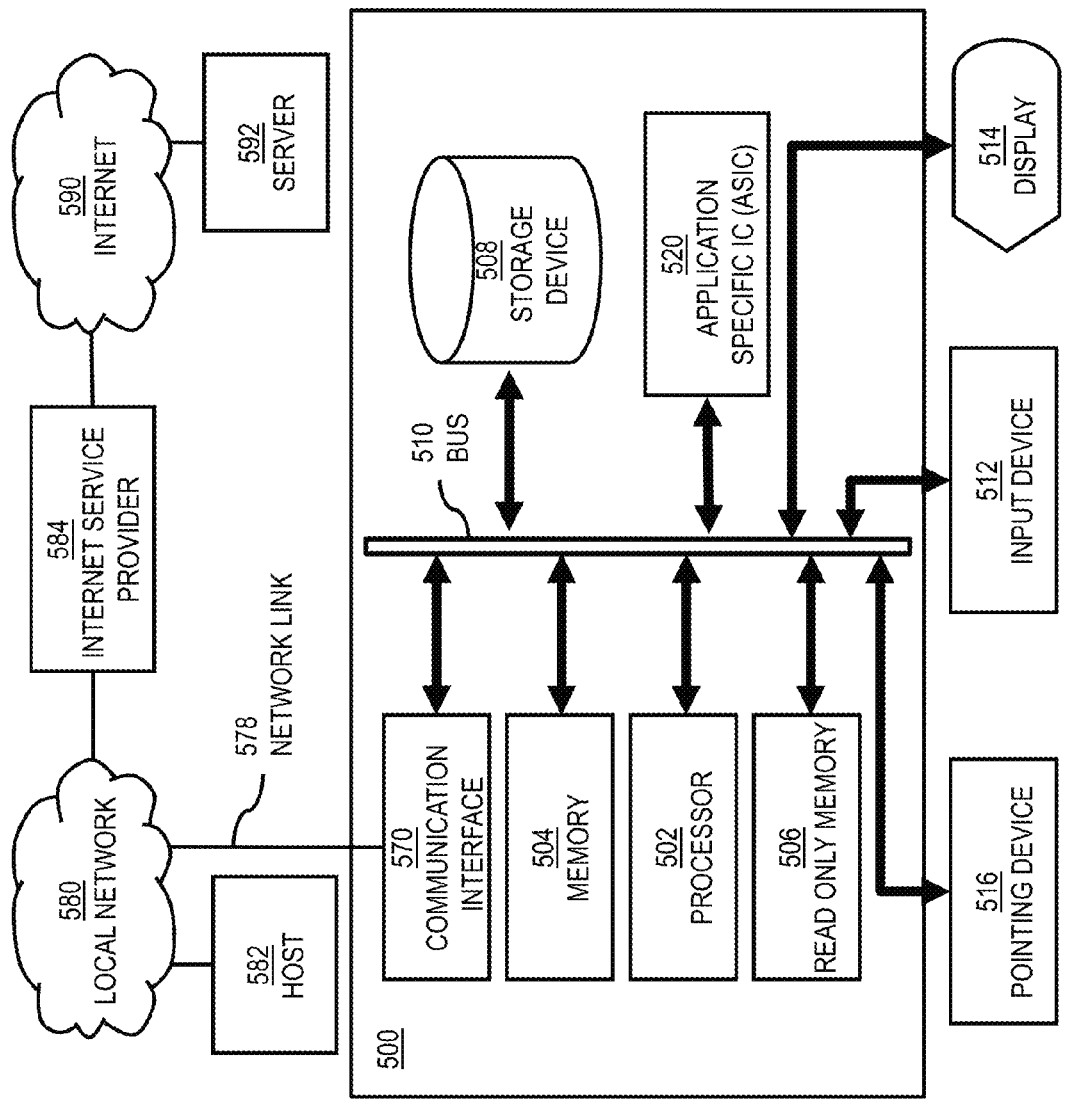
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to adapt select fields of an identifier to be associated with log data generated for an application of a user device as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of adapting select fields of an identifier to be associated with log data generated for an application of a user device.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to adapt select fields of an identifier to be associated with log data generated for an application of a user device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for adapting select fields of an identifier to be associated with log data generated for an application of a user device. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for adapting select fields of an identifier to be associated with log data generated for an application of a user device, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for adapting select fields of an identifier to be associated with log data generated for an application of a user device to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to adapt select fields of an identifier to be associated with log data generated for an application of a user device as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of adapting select fields of an identifier to be associated with log data generated for an application of a user device.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to adapt select fields of an identifier to be associated with log data generated for an application of a user device. The memory 605 also stores the data associated with or generated by the execution of the inventive steps.

Figure 7:
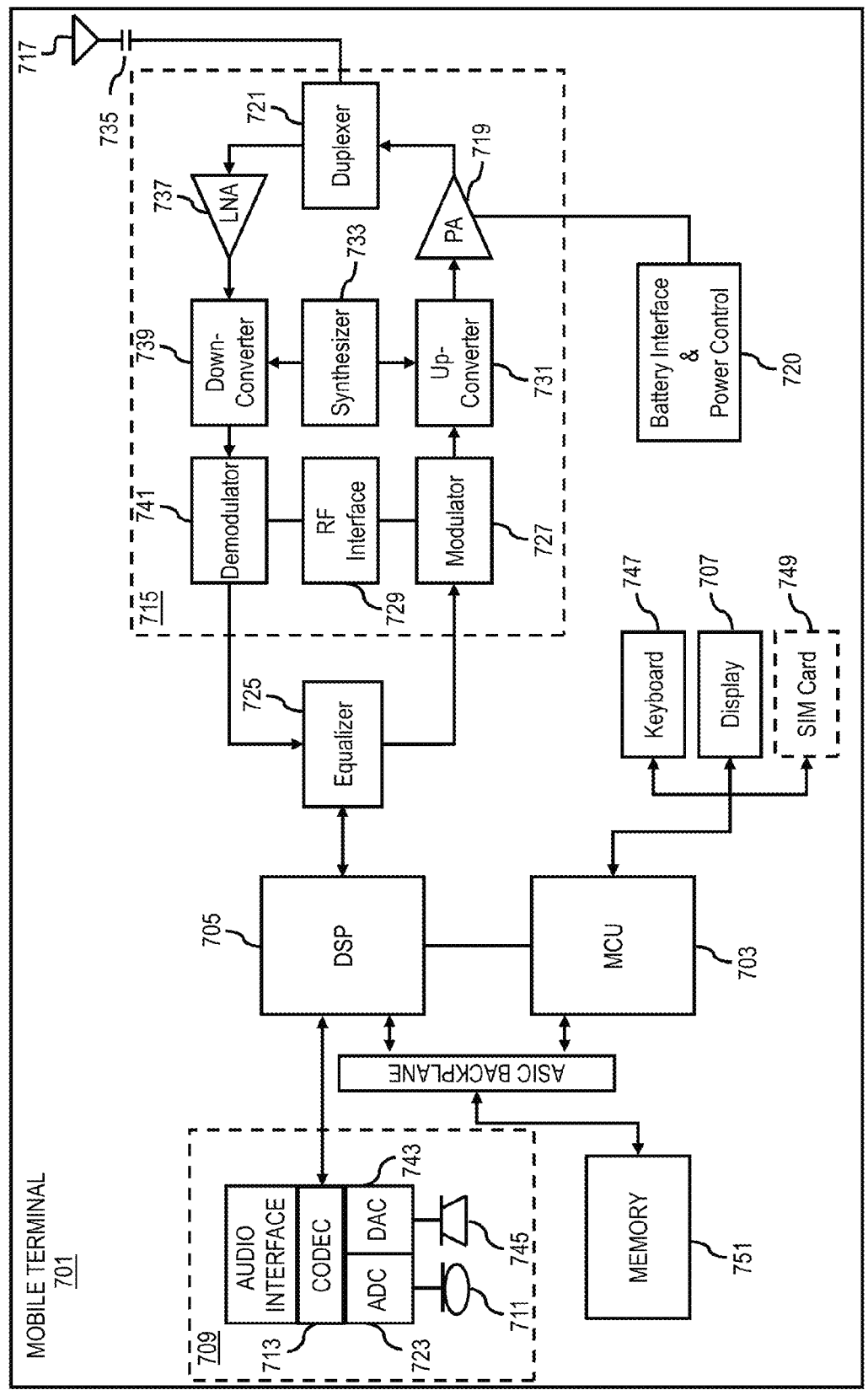
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of adapting select fields of an identifier to be associated with log data generated for an application of a user device. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of adapting select fields of an identifier to be associated with log data generated for an application of a user device. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to adapt select fields of an identifier to be associated with log data generated for an application of a user device. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for generating a structured and partially regenerable identifier comprising:
   receiving a request by a mobile service provider computer or a mobile device computer to generate at least one identifier, where the at least one identifier is regenerable and includes, at least in part, a plurality of fields;
   determining via a hardware processor of the mobile service provider computer or mobile device computer, data for populating respective ones of the plurality of fields;
   implementing via the processor a separate hash and/or encryption of the respective ones of the plurality of fields;
   implementing via the processor a generation of the at least one identifier based, at least in part, on the hashed and/or encrypted respective ones of the plurality of fields;
   receiving another request to regenerate the at least one identifier, the another request specifying one or more but less than all of the plurality of fields;
   implementing via the processor an update to the data of the one or more but less than all of the plurality of fields, where an update frequency is determined separately for two or more of the plurality of fields; and
   implementing via the processor a regeneration of the at least one identifier based, at least in part, on the update to the data.

2. The method of claim 1, further comprising:
   separately rehashing and/or reencrypting the respective ones of the plurality of fields to regenerate the at least one identifier based, at least in part, on the update.

3. The method of claim 2, further comprising:
   implementing, at least in part, the update to occur periodically, according to a schedule, on demand, randomly, or a combination thereof.

4. The method of claim 2, further comprising:
   implementing, at least in part, the rehashing and/or reencrypting of the one or more but less than all of the plurality of fields based, at least in part, on one or more new hashing and/or encryption parameters; and
   implementing an invalidation of one or more previously used hashing and/or encryption parameters.

5. The method of claim 1, further comprising:
   initiating a transmission of one or more keys associated with one or more of the hashed and/or encrypted respective ones of the plurality of fields to at least one service, at least one application, or a combination thereof;
   wherein the one or more keys facilitate access to the one or more of the hashed and/or encrypted respective ones of the plurality of fields by the at least one service, the at least one application, or a combination thereof.

6. The method of claim 5, wherein the one or more keys are determined separately for the respective ones of the plurality of fields.

7. The method of claim 5, wherein the initiating the transmission is based, at least in part, on one or more instructions from a user associated with the at least one identifier.

8. The method of claim 1, wherein the request is received from a service, an application, or a combination thereof; and the method further comprising:
   implementing, at least in part, an association of the at least one identifier with log data associated with the service, the application, or a combination thereof.

9. The method of claim 1, wherein the data for populating the respective ones of the plurality of fields includes, at least in part, a seed, a service name, a device identifier, a user identifier, an application identifier, or a combination thereof.

10. An apparatus for generating a structured and partially regenerable identifier comprising:
    a mobile service provider computer or a mobile device computer further comprising:
    at least one hardware processor; and
    at least one memory including computer program code for one or more programs,
    the at least one memory and the computer program code, with the at least one processor, configuring the apparatus to perform at least the following:
    receive a request to generate at least one identifier, where the at least one identifier is regenerable and includes, at least in part, a plurality of fields;
    determine data for populating respective ones of the plurality of fields;
    separately hash and/or encrypt the respective ones of the plurality of fields;
    implement, at least in part, a generation of the at least one identifier based, at least in part, on the hashed and/or encrypted respective ones of the plurality of fields;
    receive another request to regenerate the at least one identifier, the another request specifying one or more but less than all of the plurality of fields;
    implement, at least in part, an update to the data of the one or more but less than all of the plurality of fields, where an update frequency is determined separately for two or more of the plurality of fields; and
    implement, at least in part, a regeneration of the at least one identifier based, at least in part, on the update to the data.

11. The apparatus of claim 10, wherein the apparatus is further configured to:
    separately rehash and/or reencrypt the respective ones of the plurality of fields to regenerate the at least one identifier based, at least in part, on the update.

12. The apparatus of claim 11, wherein the apparatus is further configured to:
    implement, at least in part, the update to occur periodically, according to a schedule, on demand, randomly, or a combination thereof.

13. The apparatus of claim 11, wherein the apparatus is further configured to:
    implement, at least in part, the rehashing and/or reencrypting of the one or more but less than all of the plurality of fields based, at least in part, on one or more new hashing and/or encryption parameters; and
    implement, at least in part, an invalidation of one or more previously used hashing and/or encryption parameters.

14. The apparatus of claim 10, wherein the apparatus is further configured to:
- implement, at least in part, a transmission of one or more keys associated with one or more of the hashed and/or encrypted respective ones of the plurality of fields to at least one service, at least one application, or a combination thereof,
- wherein the one or more keys facilitate access to the one or more of the hashed and/or encrypted respective ones of the plurality of fields by the at least one service, the at least one application, or a combination thereof.

15. The apparatus of claim 14, wherein the apparatus is further configured to:
- determine the one or more keys separately for the respective ones of the plurality of fields.

16. The apparatus of claim 14, wherein the apparatus is further configured to:
- initiate the transmission based, at least in part, on one or more instructions from a user associated with the at least one identifier.

17. The apparatus of claim 10, wherein the apparatus is further configured to:
- receive the request from a service, an application, or a combination thereof; and
- implement, at least in part, an association of the at least one identifier with log data associated with the service, the application, or a combination thereof.

18. The apparatus of claim 10, wherein the data for populating the respective ones of the plurality of fields includes, at least in part, a seed, a service name, a device identifier, a user identifier, an application identifier, or a combination thereof.

* * * * *